(12) United States Patent
Rollins et al.

(10) Patent No.: US 8,095,498 B2
(45) Date of Patent: Jan. 10, 2012

(54) DATA MINING MODEL INTERPRETATION, OPTIMIZATION, AND CUSTOMIZATION USING STATISTICAL TECHNIQUES

(75) Inventors: John B. Rollins, Southlake, TX (US); Ramasubbu Venkatesh, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 590 days.

(21) Appl. No.: 12/336,927

(22) Filed: Dec. 17, 2008

(65) Prior Publication Data

US 2010/0153332 A1    Jun. 17, 2010

(51) Int. Cl.
*G06F 17/30* (2006.01)
(52) U.S. Cl. ........................................ 707/600; 707/802
(58) Field of Classification Search .................. 707/600, 707/802
See application file for complete search history.

(56) References Cited

U.S. PATENT DOCUMENTS

| 5,809,499 | A | 9/1998 | Wong et al. |
| 6,684,208 | B2 * | 1/2004 | Kil et al. ........................ 707/723 |
| 6,820,070 | B2 | 11/2004 | Goldman et al. |
| 7,043,476 | B2 * | 5/2006 | Robson ................................. 1/1 |

OTHER PUBLICATIONS

SAS Institute, Inc., "Finding the Solution to Data Mining—Exploring the Features and Components of Enterprise Miner, Release 4.1 from SAS", 27 pages.
Chua et al., "An Integrated Data Mining System to Automate Discovery of Measures of Association", Proceedings of the 33rd Hawaii International Conference on System Sciences, 2000, 10 pages.

* cited by examiner

*Primary Examiner* — Cheryl Lewis
(74) *Attorney, Agent, or Firm* — Douglas A. Lashmit; Hoffman Warnick LLC (57) ABSTRACT

A system, method, and program product for interpreting, optimizing, and customizing data mining models through the use of statistical techniques that utilize diagnostic measures and statistical significance testing. A data processing system is disclosed that includes a data mining system for mining data from a data warehouse in accordance with a data model, wherein the data model defines how data groups can be partitioned; and a data group analysis system that calculates a set of diagnostic measures and performs statistical significance tests for a defined data group.

23 Claims, 5 Drawing Sheets

Table 1

|  |  | Customer Attrition | | |
|---|---|---|---|---|
|  |  | Y | N | Total |
| Cluster | | a = 120 | b = 496 | R1 = 616 |
| Others | | c = 569 | d = 2,046 | R2 = 2,615 |
| Total | | C1 = 689 | C2 = 2,542 | N = 3,231 |

Table 2

| Significance Level | 5% | 2.5% | 1% | 0.5% | 0.1% |
|---|---|---|---|---|---|
| Chi-square critical value | 3.84 | 5.02 | 6.63 | 7.88 | 10.8 |

Table 3

| Question | Solution Strategy | Results | Observation | Interpretation |
|---|---|---|---|---|
| Is the observed difference significant? | Perform $\chi^2$ test | $\chi^2$ =1.542 | Not significant at 95% confidence level | Cluster may not represent an important customer segment |
| How likely or unlikely are the customers in this cluster to attrite? | Compute Relative Risk (RR) | RR = 0.9 (1.17) 95% Confidence Interval (CI) [0.72,1.15] | RR close to 1 | Customer attrition is not any more or less likely than in the rest of the population |

Table 4

|  | Customer Attrition | | |
|---|---|---|---|
|  | Y | N | Population |
| Tenure < 21.5 | a = 45 | b = 56 | R1 = 101 |
| Tenure >= 21.5 | c = 130 | d = 326 | R2 = 456 |
| Total | C1 = 75 | C2 = 382 | N = 557 |

Table 5

| Question | Solution Strategy | Results | Observation | Interpretation |
|---|---|---|---|---|
| Is the observed difference significant? | Perform $\chi^2$ test | $\chi^2 = 9.8$ | Highly significant at 95% confidence level | Customer segmentation based on member tenure is highly significant |
| How likely or unlikely are the customers in this cluster to attrite? | Compute the Relative Risk (RR) | RR = 1.56 with 95% CI of [1.005, 2.43] | RR > 1 Lower limit of 95% CI close to 1, need more records to narrow CI | Modest increase in risk of attrition. Members with tenure < 21.5 are 56% more likely to attrite, but need more records to gain higher confidence |

FIG. 4

Table 6

|  |  | Predicted Customer Attrition |  |
|---|---|---|---|
| Actual Response | Y | N | Total |
| Y | 47 | 21 | 68 |
| N | 734 | 2,403 | 3,137 |
| Total | 781 | 2,424 | 3,205 |

Table 7

| Diagnostic Measure | Description | Value |
|---|---|---|
| Sensitivity | Fraction of positive examples that were classified correctly | 0.69 |
| Specificity | Fraction of negative examples that were classified correctly | 0.77 |
| Odds Ratio | Odds that a positive prediction will be observed among positive examples, compared to odds of it among negative examples | 7.32 |
| Accuracy | Fraction of examples classified correctly | 0.76 |
| Positive Predictive Value | Fraction of true positives among examples predicted to be positive | 0.06 |
| Negative Predictive Value | Fraction of true negatives among examples predicted to be negatives | 0.99 |

FIG. 5

DATA MINING MODEL INTERPRETATION, OPTIMIZATION, AND CUSTOMIZATION USING STATISTICAL TECHNIQUES

FIELD OF THE INVENTION

This disclosure relates to a system and method for interpreting, optimizing, and customizing data mining models through the use of statistical techniques that utilize diagnostic measures and statistical significance testing.

BACKGROUND OF THE INVENTION

Classical statistical methods and data mining have often been viewed as two competing methodologies for drawing conclusions from data. Classical statistics relies on stochastic models and hypothesis testing, whereas data mining makes no assumptions and is data-driven. Statistical methods offer established diagnostics in well-defined contexts. Data mining is particularly well-suited for exploratory data analysis and model creation using massive, high-dimensional datasets that may not be compiled using rigorous statistical experimental design, such as data residing in an information warehouse. Data mining is heuristic and algorithmically driven, designed to extract useful patterns automatically. However, because patterns are found automatically, data mining may find patterns that appear interesting but do not represent significantly different behaviors or outcomes.

Three problems exist in this context. First, making a high-cost or high-value decision may require a rigorous interpretation of data mining results. In addition, the data mining model may need to be customized and/or optimized further for a specific application. Second, the trend toward embedding data mining in business applications requires some mechanism to help a business analyst interpret the results correctly. Third, as data mining becomes more operational, the growing need for automating the data mining process requires that the embedded interpretation be more robust and reliable.

Currently, no solution exists that addresses all three of these issues. Commercially available data mining workbenches and other data mining solutions may include certain statistical functionality for ad hoc operations such as variable selection, data exploration, data preparation, etc. But these implementations of statistical functionality do not constitute a specific methodology to combine statistical techniques with data mining for addressing the issues described above. Accordingly, a need exists for more robust analysis of data mining results.

SUMMARY OF THE INVENTION

The present invention relates to a system, method and program product for evaluating data mining operations using diagnostic measures and statistical significance tests. In one embodiment, there is a data processing system, comprising: a data mining system for mining data from a data warehouse in accordance with a data model, wherein the data model defines how data groups can be partitioned; and a data group analysis system that calculates a set of diagnostic measures and performs statistical significance tests for a defined data group.

In a second embodiment, there is a computer-readable medium computer having a computer program product stored thereon for analyzing data mining results, comprising: program code for mining data from a data warehouse in accordance with a data model, wherein the data model defines how data groups can be partitioned; and program code that calculates a set of diagnostic measures and performs statistical significance tests for a defined data group.

In a third embodiment, there is a method for analyzing data mining results, comprising: mining data from a data warehouse in accordance with a data model, wherein the data model defines how data groups can be partitioned; and calculating a set of diagnostic measures and performing statistical significance tests for a defined data group.

In a fourth embodiment, there is a method of processing data models, comprising: mining data from a data warehouse in accordance with a plurality of data models, wherein each data model defines how data groups can be partitioned; calculating one or more diagnostic measures for each of the data models; and selecting a data model based on the statistical significance of the calculated diagnostic measure or measures.

Advantages of using this invention include: improving the quality, robustness, and reliability of data mining results; making interpretation of data mining results easier for analysts with or without a high degree of statistical expertise; optimizing and customizing the data mining model in an application-specific manner; and improving and facilitating the automated interpretation of data mining results in an operational process.

The illustrative aspects of the present invention are designed to solve the problems herein described and other problems not discussed.

BRIEF DESCRIPTION OF THE DRAWINGS

These and other features of this invention will be more readily understood from the following detailed description of the various aspects of the invention taken in conjunction with the accompanying drawings.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Figure 1:
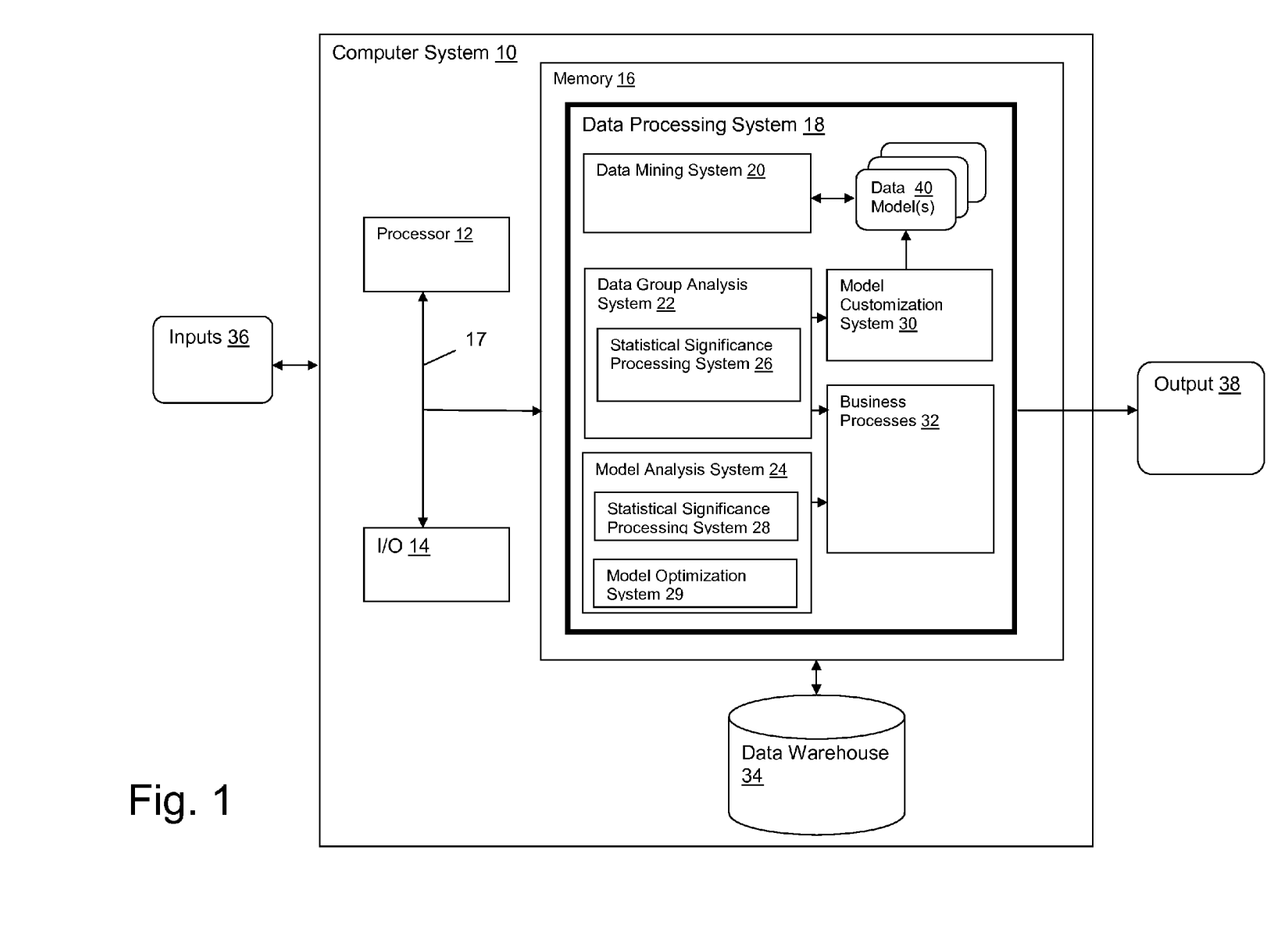
FIG. 1 depicts a computer system having data processing system in accordance with an embodiment of the present invention.

Referring to FIG. 1, a computer system 10 having a data processing system 18 in accordance with an illustrative embodiment of the invention is shown. Data processing system 18 may comprise any data processing application that analyses and processes data from a data warehouse 34. Data warehouse 34 may contain any type of data collected or utilized for any purpose, and may be distributed and/or reside remotely. Data processing system 18 may for instance be implemented as a program product stored in memory 18, which when executed by processor 12, causes computer system 10 to behave in a specific manner.

Central to the data processing system 18 is a data mining system 20 that mines information from the data warehouse based on a data model 40 in response to one or more inputs 36, e.g., user inputs made via graphical user interface (GUI), system inputs from another computing device or application, etc. Data mining may for instance include: data cleansing, transformations, group discovery, hypothesis generation, predictive modeling and scoring, interpretation, etc. Applications of data mining are numerous, and include for example gaining business or scientific insights, providing key metrics of business performance, forecasting, etc.

Data processing system 18 may also include one or more business processes 32 that utilize the results of a data mining operation to drive automated business operations. For instance, based on the results of a data mining operation, a network may be dynamically configured to most optimally route network traffic, a catalogue mailing list may be created, health insurance cost saving measures may be proposed, etc. Although shown integrated into data processing system 18, it is understood that business processes 32 may be implemented as separate systems that receive output 38 from data processing system 18.

As noted above, it is often difficult to gauge the efficacy of results from a data mining system without expert analysis to evaluate the results. In order to address this issue, data processing system 18 includes a data group analysis system 22 for statically analyzing data groups defined in the data model 40 using a statistical significance processing system 26. More particularly, data group analysis system 22 evaluates data at the group level. It can, e.g., evaluate a data group against the entire set of data or against one or more other data groups.

For instance, data group analysis system 22 may examine the number of people living in a particular zip code, earning more that a predetermined amount, under the age of 30 who purchased a new car in the last year versus the same group over 30 who purchased a new car in the last year. In addition to simply providing raw data for these data groups, statistical significance processing system 26 utilizes one or more statistical processes to measure the statistical significance of the data group. For instance, data group analysis system 22 could utilize data mining system 20 to report raw data indicating that 435 people under the age of the 30 did not purchase a new car and 13 did, compared with 736 people over the age of the 30 who did not purchase a new car and 55 who did. Statistical significance processing system 26 statistically analyzes the raw data to provide a measure regarding how significant the data is in these groups. By understanding how statistically significant the data is as defined in the model 40 by such a group partition, better business decisions can be made, e.g., should an advertising campaign be launched to primarily target to those over the age of 30. Are there better demographic group partitions that should be considered etc.

Statistical significance processing system 26 can thus be utilized to measure the efficacy of one or more different group partitions within a data model 40. Illustrative statistical tests and diagnostic measures that may be utilized are described in more detail below, but may include for instance: chi-square test, two-sample t-test, Mann-Whitney U test, Kolmogorov-Smirnov (KS) test, two-sample KS test, etc., and diagnostic measures such as relative risk or odds ratio to measure the size of an effect and associated confidence intervals. The particular type of measure(s) and tests to be utilized will generally be determined based on the data type and how the data group is being defined and analyzed.

Once the measures for one or more data groups are obtained, the results can be utilized in any fashion, e.g., provided as output 38 for further analysis, utilized to select or identify the best indicators of business performance, ranked, fed into an automated business process 32 that can then decide how to use the data mining results, etc.

In addition, a model customization system 30 may utilize the results to identify which partitions within a model 40 are the most statistically significant. Groups that are not statistically significant may for instance be "pruned" from the model 40 for future operations. More significant groups may be prioritized higher in the model 40. In general, model 40 may be customized according to a set of business rules in an application-specific manner.

In addition to analyzing the model 40 at the group level, a model analysis system 24 may be provided to analyze the statistical significance of the model 40 itself using statistical significance processing system 28. In this manner, different data models 40 may be compared to determine which model 40 yields the most overall statistically significant results. Model optimization system 29 may optimize the model. Illustrative measures include, e.g., sensitivity, specificity, odds ratio, accuracy, positive predicted value, negative predicted value, etc. Further details are provided below.

EXAMPLE 1

Statistical Significance of Data Groups Discovered by Data Mining Algorithms

One of the major tasks in data mining is clustering or partitioning of the data into data groups, i.e., subsets or clusters, with members of each group sharing similar characteristics. Interpreting the results of the clustering task may be difficult in terms of assessing how different a given cluster is from all other entities (e.g., records) or from another cluster. A classification model also may construct groups, although classification algorithms operate differently and for different purposes than do clustering algorithms. Data groups can also be constructed using other algorithms, e.g., regression models (e.g., rank and divide records into groups by deciles, quartiles, etc.) or query (e.g., construct groups meeting a set of specific criteria or attributes).

However the data groups are constructed, one of the challenges in interpreting the data mining results is to determine whether the partitioning is statistically meaningful or relevant to the problem being solved. This first example illustrates how the present solution is used to rigorously interpret the results for the cases of categorical and numeric variables in the context of clustering and classification.

CLUSTERING EXAMPLE

As part of their customer retention program, a credit card company may be interested in finding out the profile of customers who are more likely to attrite (voluntarily close their accounts). Attrition is represented by a categorical variable with possible values of Y (yes) or N (no). As part of their exploratory study, the company uses clustering algorithms to segment customers according to a number of customer credit characteristics such as credit score, delinquency, late fees paid, whether the customer exceeded credit limit, etc. They discover nine clusters. Once they have identified the clusters, the next step is to determine whether customers in a specific cluster are more or less likely to attrite than customers who do not belong to the cluster.

Figure 2:
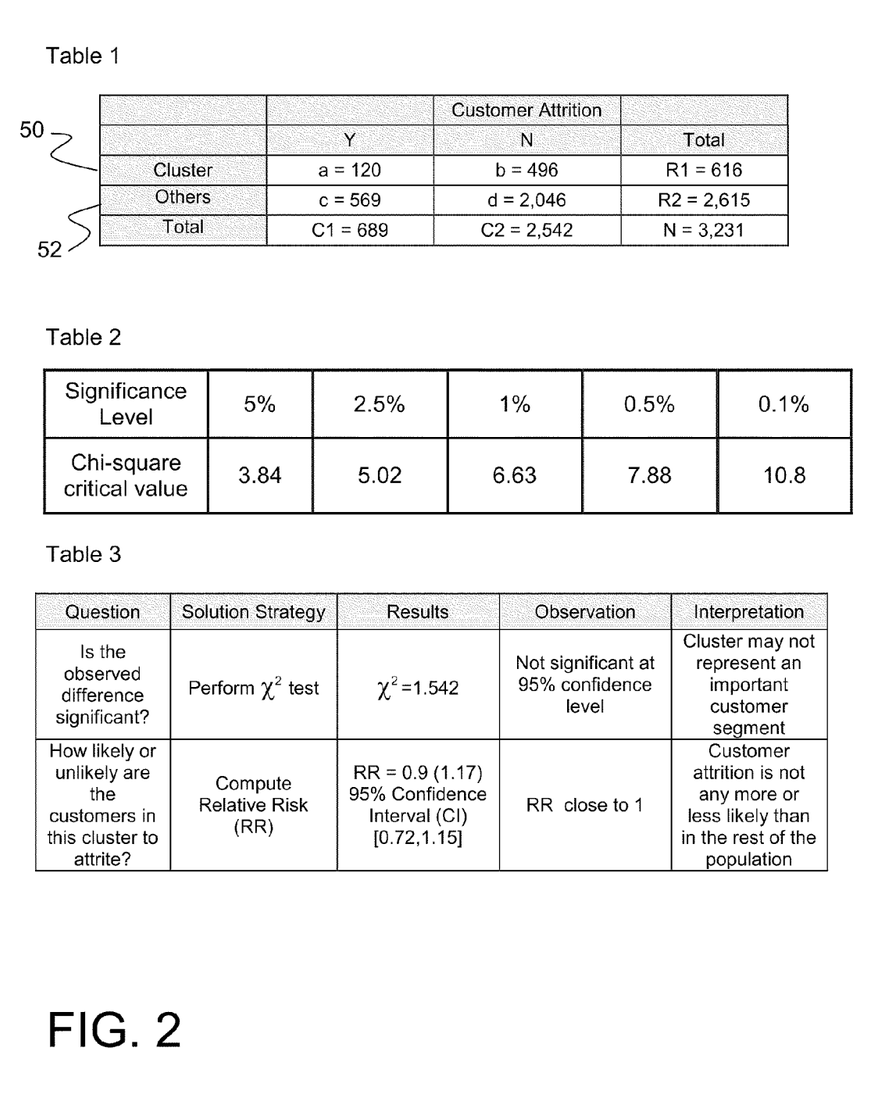
FIG. 2 depicts a set of tables showing statistical significance in accordance with an embodiment of the present invention.

In FIG. 2, Table 1, the customer attrition counts are provided for the cluster of interest 50 and all others 52. We can see that the cluster attrition rates for these two groups are about 120/616=19% and 569/2615=22%, respectively. In the example shown in FIG. 2, Table 2, a chi-square ($\chi^2$) test:

$$\chi^2 = N \frac{(ad-bc)^2}{(R_1 R_2 C_1 C_2)}$$

can be applied to generate the $\chi^2$ statistic for the 2×2 contingency table which has one degree of freedom. Using this expression, we can calculate $\chi^2$ statistic to be 3231*(120*2046−569*496)^2/(616*2615*689*2542)=1.542.

Table 3 shows chi-square critical values at different significance levels, in which it can be seen that of value of 1.542 is not significant even at a 5% significance level. This lack of significance indicates that the cluster may not represent an important segment.

$$RR = \frac{a/(a+b)}{c/(c+d)}$$

In addition, a relative risk, which is simply a ratio of attrition rates in the two groups (a/(a+b))/(c/(c+d)), is calculated as (120/616)/(569/2615) to yield a result of 0.89. Diagnostic measures such as relative risk need to be reported along with a confidence interval to indicate the uncertainty associated with the calculation. The 95% confidence interval can be computed using the expressions below:

Upper bound for 95% CI for the Relative Risk (RR):

$$e^{\ln(RR)+1.96\sqrt{\frac{1}{a}+\frac{1}{b}+\frac{1}{c}+\frac{1}{d}}}$$

Lower bound for 95% CI for the odds ratio:

$$e^{\ln(RR)-1.96\sqrt{\frac{1}{a}+\frac{1}{b}+\frac{1}{c}+\frac{1}{d}}}$$

The 95% Confidence Interval (CI) can be computed using the above expressions as [0.72, 1.15]. We now have all the statistical information we need to make a decision regarding this cluster. For this cluster, there is a modest 10% decrease in attrition risk (10%). The 95% CI lower and upper limits are relatively tight, indicating that we may not need additional information, i.e. more records, to gain confidence. The modest relative risk (close to 1 with a small chi-square value) indicates that customer attrition is not significantly different from that observed in the rest of the population. Evaluations can be performed for all nine clusters to determine whether any of them are significantly different from the rest of the population or from any other cluster (e.g., pairwise comparison) in terms of customer attrition.

CLASSIFICATION EXAMPLE

Figure 3:
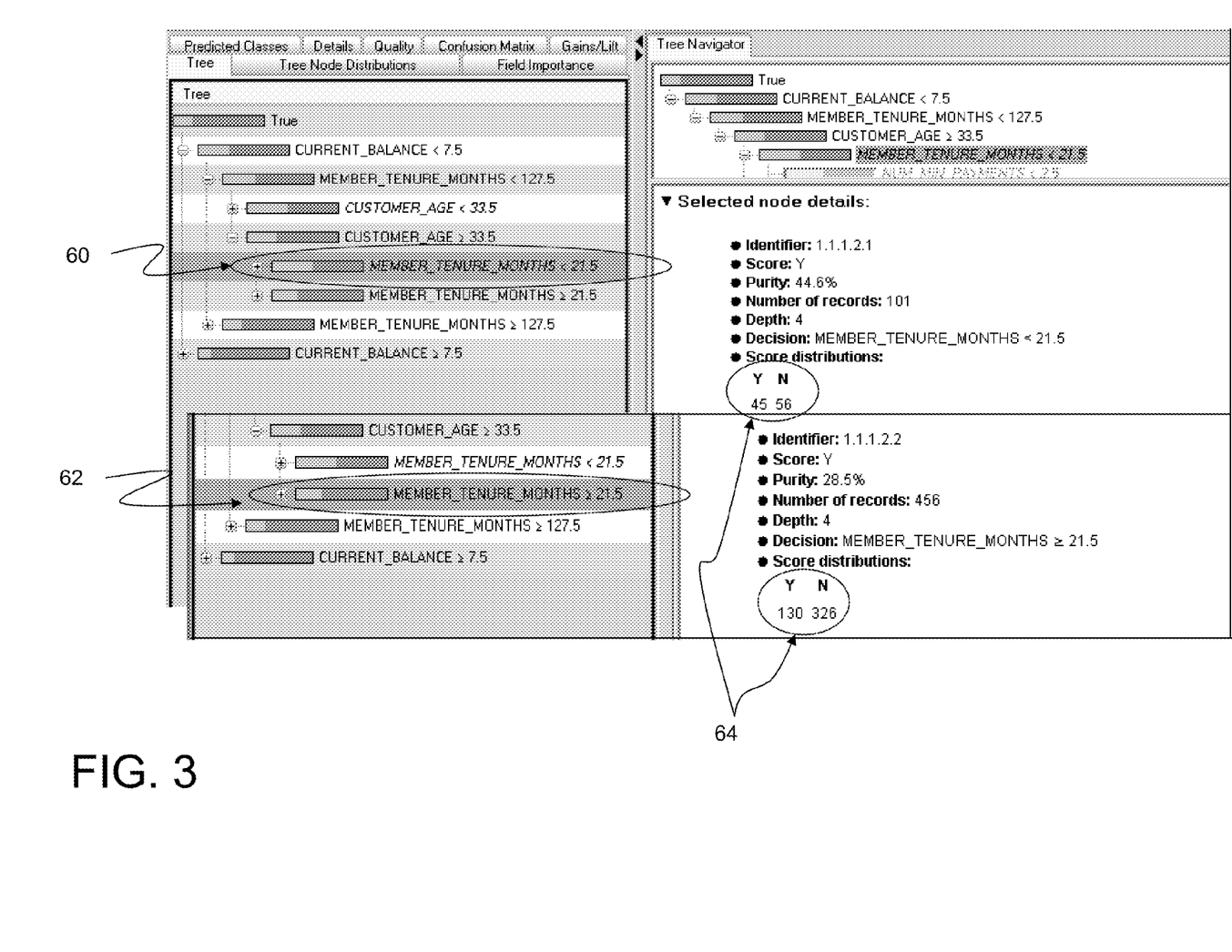
FIG. 3 depicts a decision tree model for a data mining process in accordance with an embodiment of the present invention.

Based on insights gained from their customer segmentation (e.g., clustering) analysis, the credit card company has built a data mining model to help them better identify customers at high risk of attrition. In this example, a decision tree classification model shown in FIG. 3 provides a partitioning of the dataset in a nested fashion. Given a partitioning at a decision node, questions about the significance of differences in two groups at that node can be addressed in a manner similar to that described for clustering.

Figure 4:
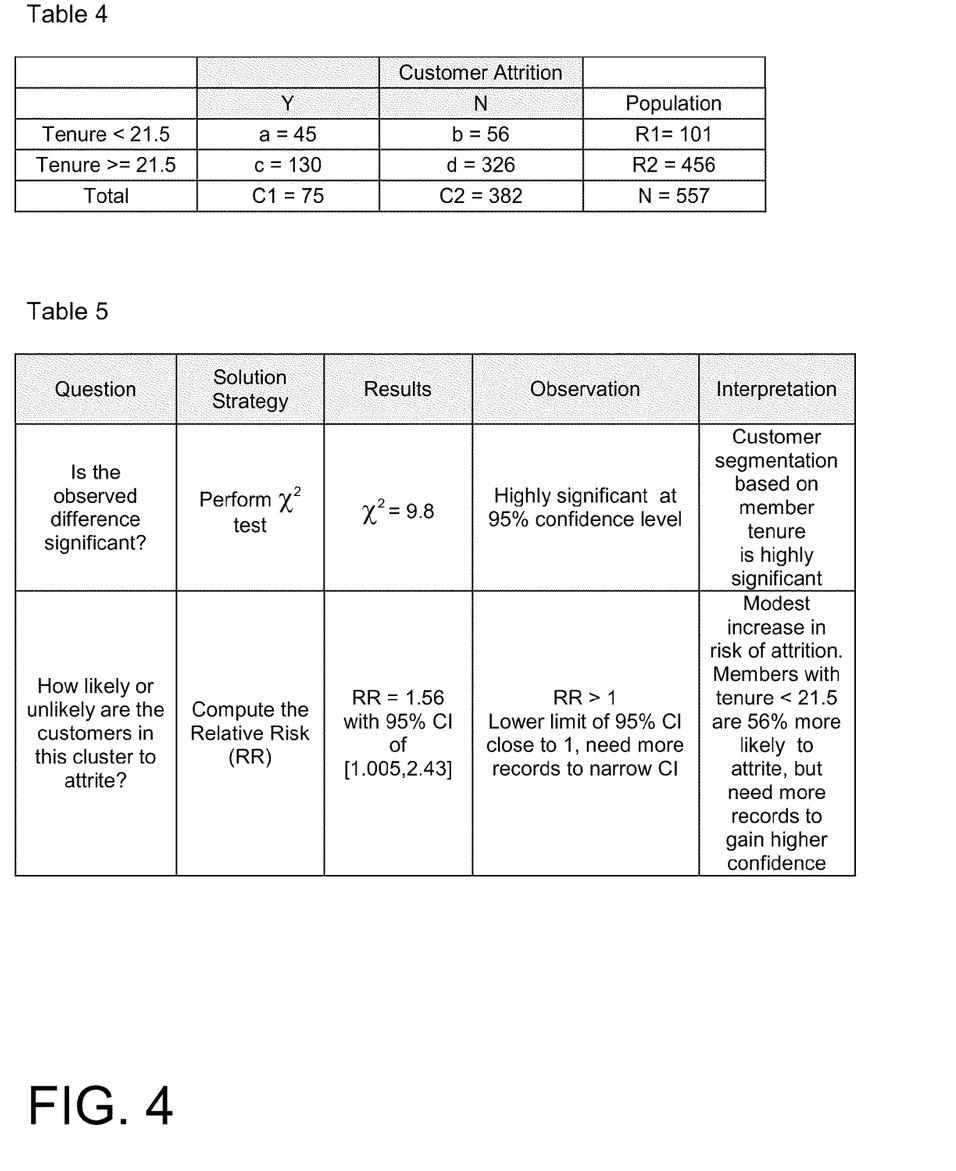
FIG. 4 depicts a set of tables showing statistical significance in accordance with an embodiment of the present invention.

In this example, the credit card company wants to determine whether the tenure of customers (how long their accounts have been open) has a significant effect on attrition. In FIG. 3, two groups 60, 62 at a "member tenure" node have a current balance <7.5, member tenure months <127.5, and customer age >=33.5. The question is whether these customers are more or less likely to attrite based on their tenure being less than 21.5 months. The resulting data 64 is shown in the node details, as well as in FIG. 4, Table 4. A chi-square test: can be applied to generate the result. Using the expression for chi-square provided earlier, we can calculate a chi-square value as (557*(45*326−56*130)^2/(101*456*175*382))= 9.88, which indicates a highly significant value. Table 3 shows chi-square critical values at different significance levels, in which it can be seen that the computed value of 9.88 is highly significant, where a smaller significance-level value implies a higher significance of the chi-square value.

The conditional relative risk can be computed using the expression provided above. Unlike in the clustering example, here the relative risk is conditional since the definition of the groups depends on how the data were partitioned in building the decision tree). In this case, relative risk is computed as RR=(45/101)/(130/456)=1.56. The lower and upper bounds of the 95% confidence interval are computed using the expressions given above for CI and are [1.005, 2.43]. Thus, we have a 56% increase in risk for members with tenure <21.5 compared to members with tenure >=21.5. The chi-square value indicates that the difference in risk is significant. The lower bound of the 95% CI is close to 1, however, which suggests that we need more records to ascertain the increase in risk with greater degree of confidence.

Significance Testing for Numeric Variables

The two examples discussed so far are for categorical variables. But a decision table such as Table 2 or Table 5 can be constructed for a numeric variable such as age, height, income, etc. For example, in a retail promotion scenario, suppose that we have identified two interesting customer segments through clustering and would like to know whether the observed difference in the annual spending is significantly different for the two groups. We can perform a two-sample t-test to determine if the difference in spending between the two segments is statistically significant. If the distribution in the two populations cannot be assumed to be normal, then a Mann-Whitney U test (a distribution-free, non-parametric test) can be performed.

If one would like to determine whether the observed distribution of a numeric variable, e.g., income, follows a reference distribution or whether two distributions are similar, the Kolmogorov-Smirnov (KS) test or two-sample KS test, respectively, can be performed. Thus, appropriate statistical significance tests are associated with data group discovery or definition by data mining algorithms in various contexts.

EXAMPLE 2

Significance Testing for Evaluating Classification Results

Predictive modeling is another major task in data mining. In this second example, the test results for a decision tree model of credit card attrition are presented as a confusion matrix in FIG. 5, table 5. The confusion matrix shows how well the model performed in predicting the actual attrition status of the customers in the test dataset.

Figure 5:
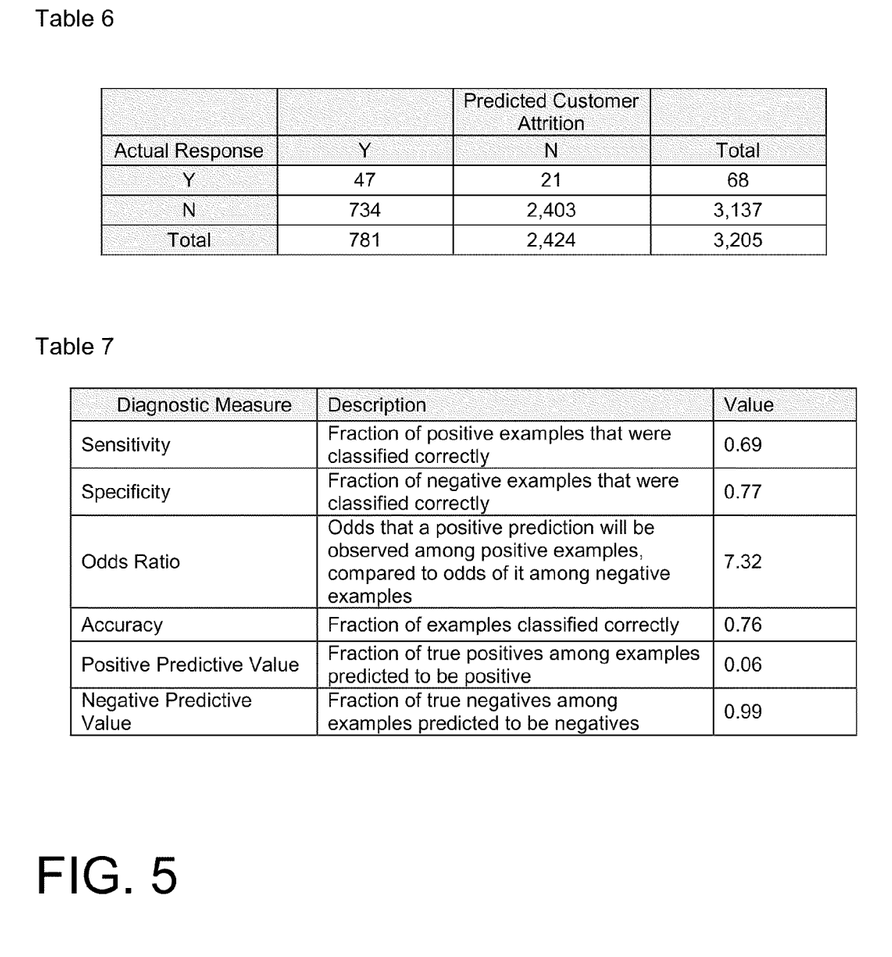
FIG. 5 depicts a set of tables showing statistical significance in accordance with an embodiment of the present invention.

Performing a chi-square test results in a computed chi-square value of 75, the results are highly significant even at a 99.9% confidence level. In addition to statistical significance of the results, diagnostic measures such as sensitivity, specificity, accuracy, odds ratio, positive and negative predictive values can be computed. These diagnostic measures are of great practical value and in fields such as medical diagnostics reporting them along with the test results is mandatory.

The computed diagnostic measures shown in FIG. 5, table 7 give insight and a rigorous basis to evaluate the model. While sensitivity of 0.69 may be good for addressing credit card attrition the same may not be acceptable for a HIV test. Similarly, the specificity of 0.77 may not be adequate where a decision to perform high risk invasive surgery or provide treatment with grave side effects is involved. Also, a low positive predictive value would suggest that model is prone to generate lots of false positives and therefore may not be acceptable if testing positive leads to costly decisions. Diagnostic measures can help make context specific decisions in a rigorous manner.

Frequently, in the exploratory analysis stage, several classification models are considered, and the best one is chosen. Model analysis system 24 (FIG. 1) provides a rigorous way to compare the models 40. McNemar's test, closely related to the chi-square test, can be used to determine whether the observed difference in the misclassification rates of the two models is statistically significant.

Evaluation of a single classifier model and the comparison of models discussed so far have been for a single decision threshold. For a classifier model that provides a probability score for each record to belong to a class or group, a threshold choice can be made across the range of scores, each resulting in a different set of diagnostic measures. For example, a plot of sensitivity vs. (1-specificity) across the entire range of decision threshold is called the Receiver Operating Characteristics (ROC) curve. The ROC curve can be used to provide a global assessment of the model or compare two models. The area under the ROC curve (AUC) can be used as a diagnostic to assess the global quality of the classifier model. For example, a value of 0.5 for the AUC implies that the classifier is no better than a random classifier, a value of 1.0 makes it a perfect classifier, and any value in between is evaluated for statistical significance. Using the ROC curve, an optimal operating point can be determined, and diagnostic measures can be generated. In the exploratory stage, when several competing classifier models are considered, ROC curves can be generated for the models. A determination can then be made as to whether the models are statistically significantly different from each other. The ROC approach is an indispensable tool in the context of automatic data mining.

As noted above, the described embodiments can be implemented in a variety of ways. For instance, they could be incorporated as additional functionality in existing software. This software could be a data mining workbench or a database-centric tool suite, providing expert analysts with more rigorous capabilities for data mining model interpretation.

Further, the features could be implemented in an end-user application or tool designed to address a particular business problem. For example, an application for retail promotions could perform data mining (clustering) to discover customer segments. A promotion may have the objective of targeting a small number of customer groups with varying attributes, using different marketing channels to appeal selectively to the groups. If the data mining yields a large number of clusters, then applying statistical significance testing to pairs of clusters (as described in Example 1) provides a rigorous basis for combining clusters to generate the necessary number of target groups with as much homogeneity within each group as possible.

Another implementation could be customizing a risk model based on a decision tree to identify subgroups with a certain risk profile using the diagnostic measures and statistical significance testing. Once identified, a solution tailored specifically for that subgroup can be developed. For example, for an auto insurance risk model, this subgroup could be a group of owners who have expensive cars but seldom drive them. A specific insurance plan with a lower, more competitive premium could be developed to target this group. As another example, for a cancer risk model, this subgroup could be coal miners who work seasonally in the coal mining industry. Essentially, the current invention allows model customization to target specific risk groups when the overall risk model is high-dimensional, i.e., the model includes a large number of explanatory variables.

In a further example, the features could be implemented through embedding a series of analysis steps applied to data mining results in an automated business process. For example, an automated process could use database-resident data mining capabilities to create or refresh a data mining model as new data flow into a database. Statistical significance tests could then be automatically applied to the mining results to perform automatic interpretation of the results and take an automatic action based on that interpretation.

One trend in business process optimization is the development of ready-to-go, application-specific information appliances in which software and hardware components are optimized to work together and provide complete and scalable vertical solutions. An example of such an appliance would be an analytical server that integrates business intelligence solutions optionally for a vertical application such as healthcare fraud analytics with a balanced warehouse solution. One or more of the described embodiments could integrated into such a solution to provide a sound statistical basis for making business decisions.

Below, pseudocodes or high-level natural language descriptions of illustrative algorithms for testing for differences between groups identified by data mining algorithms (i.e., data analysis system 22) and for choosing the best predictive model from a set of competing models (model analysis system 24) are shown. These pseudocodes describe how heuristics can be implemented for typical use cases discussed previously.

Pseudocode for Testing for Difference Between Groups

```
.... list significant groups from data mining model for variable of
      interest
    FOR TARGET VARIABLE
       LIST SIGNIFICANT GROUPS (TARGET VARIABLE)
    ..... generate a ranked list of statistically significant groups from data
mining model for variable of interest
       LIST SIGNIFICANT GROUPS (VARIABLE_OF_INTEREST)
       ..... compare distribution of variable_of_interest in group I with
that in the rest of the population
       FOR EACH GROUP I, I = 1,..., N
          GROUP COMPARISON WITH REST (GROUP I, REST)
          COMPUTE STATISTICAL SIGNIFICANCE STATISTIC &
DIAGNOSTICS
          RANK GROUP I BY STATISTIC
       ..... do pairwise comparison
       FOR ALL GROUPS J > I
          PAIRWISE GROUP COMPARISON
(VARIABLE_OF_INTEREST,GROUP I, GROUP J)
          COMPUTE STATISTICAL SIGNIFICANCE STATISTIC,
```

```
DIAGNOSTICS
        RANK GROUP J BY STATISTIC
        RETURN STATISTICAL SIGNIFICANCE MEASURES,
DIAGNOSTICS FOR BOTH TYPES OF COMPARISON
}..... do pairwise comparison of distribution of variable_of_interest in
group I with that in the rest of the population PAIRWISE GROUP
COMPARISON
(VARIABLE_OF_INTEREST, GROUP I, GROUP J)
{ IF VARIABLE_OF_INTEREST ISCATEGORICAL
        PERFORM CHI-SQUARE TEST
        COMPUTE CHI-SQUARE VALUE, SIGNIFICANT_95%
(HIGHLY SIGNIFICANT, SIGNIFICANT, NOT SIGNIFICANT)
        COMPUTE DIAGNOSTICS, e.g., ODDS RATIO, 95%_CI,
REMARKS
    IF VARIABLE_OF_INTEREST ISNUMERICAL
        PERFORM TWO-SAMPLE T-TEST
        OUTPUT T-Statistic, SIGNIFICANT_95% (HIGHLY
SIGNIFICANT,
    SIGNIFICANT, NOT SIGNIFICANT)
        OPTIONAL MANN-WHITNEY U STATISTIC
        RETURN STATISTICAL SIGNIFICANCE MEASURES,
        DIAGNOSTICS
```

Pseudocode for Choosing Best Predictive Model

```
... select the best predictive model based on user specified selection
criteria
SELECT MODEL (MODEL 1, MODEL 2,..., MODEL N,
SELECT_CRITERIA)
FOR SELECTED_MODEL
    OUTPUT STATISTICAL SIGNIFICANCE MEASURES &
DIAGNOSTICS
SELECT MODEL (MODEL 1, MODEL 2, ..., MODEL N,
SELECT_CRITERIA)
{
... select the best predictive model by using ROC technique
    SELECT_CRITERIA.MODE GLOBAL
        GENERATE ROC CURVES (MODEL 1,...MODEL N)
        FOR I = 1,...,N
            IF AUC_MODEL_I > 0.5 AND STATISTICALLY
SIGNIFICANT ACCEPT
                ELSE REJECT
        RANK ACCEPTED MODELS BY AUC
    IF MODEL_WITH_HIGHEST_AUC STATISTICALLY
SIGNIFICANTLY DIFFERENT FROM
        OTHER MODELS
            IDENTIFY OPTIMAL DECISION_POINT BY
SELECT_CRITERIA_WEIGHTS_FOR_DIAGNOSTICS_MEAS-
            URES RETURN STATISTICAL SIGNIFICANCE MEASURES &
DIAGNOSTICS FOR
            MODEL_WITH_HIGHEST_AUC
        ELSE
            IDENTIFY OPTIMAL DECISION_POINT BY
SELECT_CRITERIA_WEIGHTS_FOR_DIAGNOSTICS_MEAS-
            URES FOR MODEL_WITH_HIGHEST_AUC AND
MODELS WITH SIMILAR
            ROC PERFORMANCE
                RETURN STATISTICAL SIGNIFICANCE MEASURES &
DIAGNOSTICS FOR THESE MODELS
... select the best predictive model by using hybrid technique using ROC
curves to assess each model globally, accept statistically significant
models, choose an optimal decision point for each of them, compute
diagnostics, build an aggregated measure by weighting each diagnostic
using user specified weights, compare models using aggregated measure,
test for statistical significance, choose best model(s)
    SELECT_CRITERIA.MODE HYBRID
        GENERATE ROC CURVES (MODEL 1,...MODEL N)
        FOR I = 1,...N
            IF AUC_MODEL_I > 0.5 AND STATISTICALLY
SIGNIFICANT
                IDENTIFY OPTIMAL DECISION_POINT BY
SELECT_CRITERIA_WEIGHTS_FOR_DIAGNOSTICS_MEAS-
                URES COMPARE MODELS USING WEIGHTED
DIAGNOSTICS MEASURES,
                TEST FOR STATISTICAL SIGNIFICANCE STORE BEST
MODEL(S)
                ELSE REJECT
        RETURN STATISTICAL SIGNIFICANCE MEASURES &
DIAGNOSTICS FOR BEST
        MODEL(S)
... select the best predictive model using McNemar's test at a fixed
predetermined decision point
SELECT_CRITERIA.MODE FIXED
    IF SELECT_CRITERIA.DIAGNOSTIC_TO_RANK ACCURACY
        RANK MODELS BY ACCURACY
        FOR MODEL WITH HIGHEST ACCURACY
            PERFORM PAIRWISE McNEMAR's TEST
        IF MODEL WITH HIGHEST ACCURACY STATISTICALLY
SIGNIFICANTLY
            DIFFERENT RETURN STATISTICAL SIGNIFICANCE
MEASURES &
            DIAGNOSTICS FOR MODEL WITH HIGHEST ACCURACY
        ELSE
            RETURN STATISTICAL SIGNIFICANCE MEASURES
            & DIAGNOSTICS FOR
            MODEL WITH HIGHEST ACCURACY AND
            STATSITICALLY SIMILAR MODELS
... select the best predictive model at a fixed predetermined decision
point as in previous step but use a specific diagnostic measure or
weighted diagnostic measure to rank and compare the models...code
shown only for ranking using weighted diagnostic measure but will be
structurally same if a specific diagnostic measure was chosen
    ELSE
        RANK MODELS USING WEIGHTED DIAGNOSTIC
        MEASURE FOR MODEL WITH HIGHEST RANKING
            PERFORM PAIRWISE STATISTICAL SIGNIFICANCE
TEST
            IF MODEL WITH HIGHEST RANKING
STATISTICALLY SIGNIFICANTLY
            DIFFERENT RETURN STATISTICAL SIGNIFICANCE
MEASURES &
                DIAGNOSTICS FOR MODEL WITH HIGHEST RANKING
                ELSE
                RETURN STATISTICAL SIGNIFICANCE MEASURES
            & DIAGNOSTICS FOR
                MODEL WITH HIGHEST RANKING AND
        STATSITICALLY SIMILAR MODELS
}
```

Referring again to FIG. 1, it is understood that computer system 10 may be implemented as any type of computing infrastructure. Computer system 10 generally includes a processor 12, input/output (I/O) 14, memory 16, and bus 17. The processor 12 may comprise a single processing unit, or be distributed across one or more processing units in one or more locations, e.g., on a client and server. Memory 16 may comprise any known type of data storage, including magnetic media, optical media, random access memory (RAM), read-only memory (ROM), a data cache, a data object, etc. Moreover, memory 16 may reside at a single physical location, comprising one or more types of data storage, or be distributed across a plurality of physical systems in various forms. Data warehouse 34 may likewise reside at a single physical location, comprising one or more types of data storage, or be distributed across a plurality of physical systems in various forms.

I/O 14 may comprise any system for exchanging information to/from an external resource. External devices/resources may comprise any known type of external device, including a monitor/display, speakers, storage, another computer system, a hand-held device, keyboard, mouse, voice recognition system, speech output system, printer, facsimile, pager, etc. Bus 17 provides a communication link between each of the components in the computer system 10 and likewise may comprise any known type of transmission link, including electrical, optical, wireless, etc. Although not shown, additional components, such as cache memory, communication systems, system software, etc., may be incorporated into computer system 10.

Access to computer system 10 may be provided over a network such as the Internet, a local area network (LAN), a wide area network (WAN), a virtual private network (VPN), etc. Communication could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, an Internet service provider could be used to establish interconnectivity. Further, as indicated above, communication could occur in a client-server or server-server environment.

It should be appreciated that the teachings of the present invention could be offered as a business method on a subscription or fee basis. For example, a computer system 10 comprising a data processing system 18 could be created, maintained and/or deployed by a service provider that offers the functions described herein for customers. That is, a service provider could offer to deploy or provide the ability to statistically analyze data mining results as described above.

It is understood that in addition to being implemented as a system and method, the features may be provided as a program product stored on a computer-readable medium, which when executed, enables computer system 10 to provide a data processing system 18. To this extent, the computer-readable medium may include program code, which implements the processes and systems described herein. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as memory 16 and/or a storage system, and/or as a data signal traveling over a network (e.g., during a wired/wireless electronic distribution of the program product).

As used herein, it is understood that the terms "program code" and "computer program code" are synonymous and mean any expression, in any language, code or notation, of a set of instructions that cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like. Further, it is understood that terms such as "component" and "system" are synonymous as used herein and represent any combination of hardware and/or software capable of performing some function(s).

The block diagrams in the figures illustrate the architecture, functionality, and operation of possible implementations of systems, methods and computer program products according to various embodiments of the present invention. In this regard, each block in the block diagrams may represent a module, segment, or portion of code, which comprises one or more executable instructions for implementing the specified logical function(s). It should also be noted that the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams can be implemented by special purpose hardware-based systems which perform the specified functions or acts, or combinations of special purpose hardware and computer instructions.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A data processing system, comprising:
    a data mining system for mining data from a data warehouse in accordance with a data model, wherein the data model defines how data groups can be partitioned; and
    a data group analysis system that calculates a set of diagnostic measures and performs statistical significance tests for a defined data group.

2. The data processing system of claim 1, wherein the data group analysis system compares a first data group with a second data group and wherein the statistical tests are selected from a group consisting of: chi-square test, two-sample t-test, Mann-Whitney U test, Kolmogorov-Smirnov (KS) test, and two-sample KS test; and diagnostic measures include relative risk or odds ratio to measure a size of an effect and associated confidence intervals.

3. The data processing system of claim 1, wherein the data group analysis system compares a first data group with all other data.

4. The data processing system of claim 1, wherein statistical tests that may be utilized are selected from a group consisting of: chi-square test, two-sample t-test, Mann-Whitney U test, Kolmogorov-Smirnov (KS) test, and two-sample KS test; and diagnostic measures include relative risk or odds ratio to measure a size of an effect and associated confidence intervals.

5. The data processing system of claim 1, wherein the data groups are partitioned using a technique selected from a group consisting of: clustering, regression modeling, querying, and decision tree modeling.

6. The data processing system of claim 1, further comprising a model optimization system that refines data group partitioning based on the set of diagnostic measures calculated and statistical significance tests performed for a plurality of data groups.

7. The data processing system of claim 1, further comprising at least one business process that uses the set of diagnostic measures and statistical significance tests in an automated fashion to evaluate data mining results.

8. A computer-readable storage medium computer having a computer program product stored thereon for analyzing data mining results, comprising:
    program code for mining data from a data warehouse in accordance with a data model, wherein the data model defines how data groups can be partitioned; and
    program code that calculates diagnostic measures and performs statistical significance tests for a defined data group.

9. The computer-readable storage medium of claim 8, wherein the program code that calculates a set of statistical significance measures compares a first data group with a second data group, and wherein the set of statistical significance measures consist of: a chi-square measurement, an odds ratio, and a confidence interval of the odds ratio.

10. The computer-readable storage medium of claim 8, wherein program code that calculates a set of statistical significance measures compares a first data group with all other data.

11. The computer-readable storage medium of claim 8, wherein the statistical tests are selected from a group consisting of: chi-square test, two-sample t-test, Mann-Whitney U test, Kolmogorov-Smirnov (KS) test, and two-sample KS test; and diagnostic measures include relative or odds ratio to measure a size of an effect and associated confidence intervals.

12. The computer-readable storage medium of claim 8, wherein the data groups are partitioned using a technique selected from a group consisting of: clustering, regression modeling, querying, and decision tree modeling.

13. The computer-readable storage medium of claim 8, further comprising program code that refines data group partitioning based on the set of diagnostic measures calculated and statistical significance tests performed for a plurality of data groups.

14. The computer-readable storage medium of claim 8, further comprising program code for implementing at least one business process that uses the set of diagnostic measures and statistical significance tests in an automated fashion to evaluate data mining results.

15. A method for analyzing data mining results, comprising:
    mining data from a data warehouse in accordance with a data model, wherein the data model defines how data groups can be partitioned; and
    calculating a set of diagnostic measures and performing statistical significance tests for a defined data group.

16. The method of claim 15, wherein calculating the set of statistical significance measures compares a first data group with a second data group, and wherein the set of statistical significance measures consist of: a chi-square measurement, an odds ratio and a confidence interval of the odds ratio.

17. The method of claim 15, wherein calculating the set of statistical significance measures compares a first data group with all other data.

18. The method of claim 15, wherein the set of statistical significance measures are selected from a group consisting of: a chi-square measurement, an odds ratio, a confidence interval of the odds ratio, a two-sample t-test, a Mann-Whitney U test, a Kolmogorov-Smirnov (KS) test, and a two-sample KS test.

19. The method of claim 15, wherein the data groups are partitioned using a technique selected from a group consisting of: clustering, regression modeling, querying, and decision tree modeling.

20. The method of claim 15, further comprising refining data group partitioning based on the set of statistical significance measures calculated for a plurality of data groups.

21. The method of claim 15, further comprising implementing at least one business process that uses the set of statistical significance measures in an automated fashion to evaluate data mining results.

22. A method of processing data models, comprising:
    mining data from a data warehouse in accordance with a plurality of data models, wherein each data model defines how data groups can be partitioned;
    calculating a statistical significance measure of each of the data models; and
    selecting a data model based on the calculated statistical significance measures.

23. The method of claim 22, wherein the statistical significance measure is calculated using a statistical technique selected from a group consisting of: a Receiver Operating Characteristics (ROC) curve/Area Under Curve (AUC) model and McNemar's test.

* * * * *